United States Patent [19]
Saito et al.

[11] 3,879,741
[45] Apr. 22, 1975

[54] INTERMEDIATE RING FOR INTERLOCKING AN APERTURE RING WITH AN EXPOSURE METER

[75] Inventors: Yutaka Saito, Koganli; Kunihiro Fukino, Tokyo, both of Japan

[73] Assignee: Nippon Kogaku K.K., Tokyo, Japan

[22] Filed: Sept. 4, 1973

[21] Appl. No.: 393,820

[30] Foreign Application Priority Data
Sept. 26, 1972 Japan............................ 47-11091

[52] U.S. Cl................................. 354/46; 354/295
[51] Int. Cl............................................... G03b 7/20
[58] Field of Search........... 95/42, 64 R, 64 B, 10 C; 354/286, 295, 46; 350/255

[56] References Cited
UNITED STATES PATENTS

| | | | |
|---|---|---|---|
| 3,461,783 | 8/1969 | Fujii............................. | 95/64 R X |
| 3,485,154 | 12/1969 | Yamada......................... | 95/64 R X |
| 3,495,514 | 2/1970 | Nakamura et al................ | 95/42 X |
| 3,532,036 | 10/1970 | Nakamura...................... | 95/42 X |

*Primary Examiner*—Samuel S. Matthews
*Assistant Examiner*—E. M. O'Connor
*Attorney, Agent, or Firm*—Shapiro and Shapiro

[57] ABSTRACT

An intermediate ring assembly is employed for insertion between a camera body having a meter interlocking member interlocking with an exposure meter contained in the camera body and an interchangeable lens having an aperture ring with an aperture-ring interlocking member secured thereto. The intermediate ring assembly includes a first coupling portion for connection with the camera body, a second coupling portion for connection with the interchangeable lens, a rotatable ring rotatably mounted on the intermediate ring body, a first interlocking means adapted for connection with the meter interlocking member of the camera body upon connection between the intermediate ring assembly and the camera body, and a second interlocking means supported on the rotatable ring, movable with respect thereto and biased toward the axis of rotation of the rotatable ring, for engaging the aperture-ring interlocking member after connection between the intermediate ring assembly and the interchangeable lens.

5 Claims, 4 Drawing Figures

INTERMEDIATE RING FOR INTERLOCKING AN APERTURE RING WITH AN EXPOSURE METER

BACKGROUND OF THE INVENTION

1. Field of the Invention

The invention relates to an intermediate ring assembly for insertion between a camera body containing an exposure meter therein and a lens barrel, and for interlocking the aperture ring of the lens barrel with the exposure meter.

2. Description of the Prior Art

In a camera of the type wherein the aperture ring of the lens barrel is provided with an aperture-ring interlocking member which may be connected with a meter interlocking member on the exposure meter provided in the camera body for transmitting aperture information to the exposure meter, no connection can take place between the aperture-ring interlocking member and the meter interlocking member when an intermediate ring is inserted between the camera body and the lens barrel, as is necessary for close-up photography, so that aperture information cannot be transmitted to the exposure meter. To avoid this, the intermediate ring must be provided with coupling means for establishing an indirect connection between the aperture-ring interlocking member on the aperture ring of the lens barrel and the meter interlocking member for the exposure meter in the camera body.

However, in a system using a bayonet connector to assemble an intermediate ring and a lens barrel together, no assemblage can take place therebetween unless the respective members are brought to corresponding circumferential positions. With the conventional bayonet system, therefore, assemblage of the intermediate ring and the lens barrel has required pre-adjustment of the relative positions of the coupling means of the intermediate ring and the aperture-ring interlocking member on the aperture ring of the lens barrel to such circumferential positions as will permit a connection therebetween. This pre-adjustment of the relative position of the coupling means and the aperture-ring interlocking member to corresponding circumferential positions has involved very cumbersome procedures.

SUMMARY OF THE INVENTION

It is an object of the present invention to provide an intermediate ring having simple construction and which will readily permit the interlocking means of the intermediate ring and the aperture-ring interlocking member on the aperture ring of the lens barrel to be connected together after assemblage of the intermediate ring and the lens barrel by means of a bayonet connector.

According to the present invention, there is provided an intermediate ring assembly for insertion during close-up photography between a camera body containing therein an exposure meter and having a meter interlocking member interlocking with the exposure meter and an interchangeable lens having an aperture ring and an aperture-ring interlocking member secured to the aperture ring and adapted for connection with the meter interlocking member when the interchangeable lens is mounted on the camera body. The intermediate ring assembly comprises an intermediate ring body which has a first coupling portion adapted for connection with the camera body and a second coupling portion adapted for connection with the interchangeable lens. Coupling means in the form of a rotatable ring is rotatably mounted on the intermediate ring body. A first interlocking means is secured to the rotatable ring and adapted for connection with the meter interlocking member of the camera body when the intermediate ring body and the camera body are connected together. A second interlocking means is supported on the rotatable ring and movable with respect thereto for engaging the aperture-ring interlocking member of the interchangeable lens when the intermediate ring body and the interchangeable lens are connected together. The second interlocking means is biased toward the axis of rotation of the rotatable ring for causing the second interlocking means to engage the aperture-ring interlocking member of the interchangeable lens. Thus, when the intermediate ring assembly is inserted between the camera body and the interchangeable lens, the meter interlocking member of the camera body and the aperture-ring interlocking member of the interchangeable lens are connected together by the first and second interlocking means and the rotatable ring.

The invention will become more fully apparent from the following detailed description of an embodiment thereof taken in conjunction with the accompanying drawings.

DESCRIPTION OF THE PREFERRED EMBODIMENTS

Figure 1:
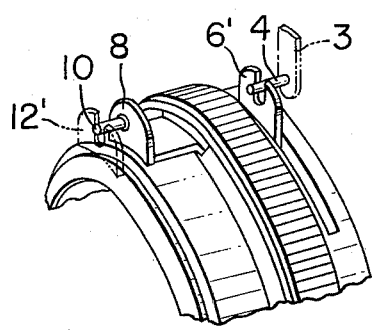
FIG. 1 is a fragmentary perspective view of an intermediate ring assembly constructed according to the invention.
Figure 2:
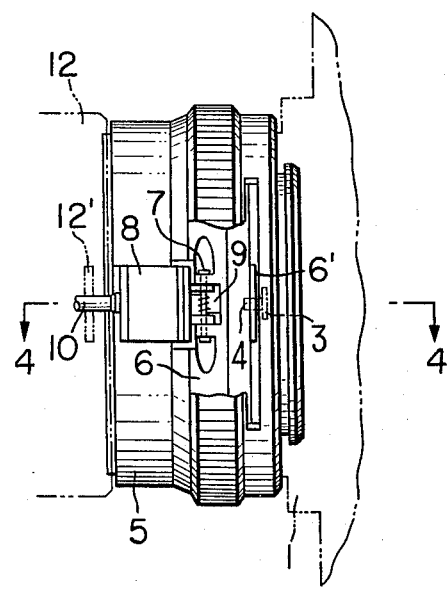
FIG. 2 is a plan view of the intermediate ring assembly as it would be positioned between a camera and a lens.
Figure 3:
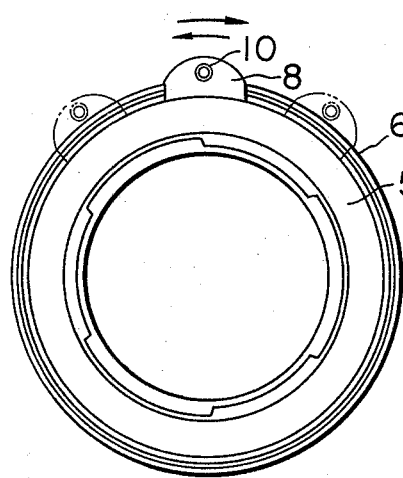
FIG. 3 is a front elevation of the intermediate ring assembly.
Figure 4:
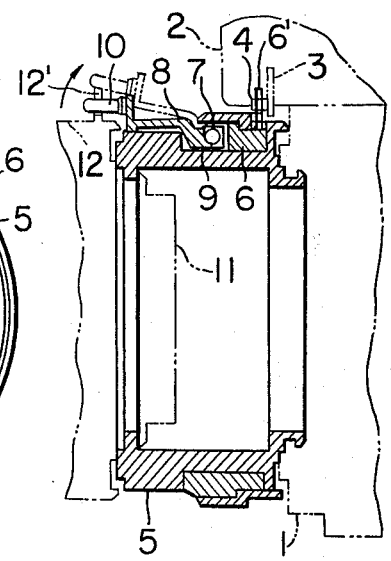
FIG. 4 is a vertical section of the intermediate ring assembly taken approximately through the plane of line 4—4 in FIG. 2.

Referring to the drawings, a camera body 1 is equipped with an exposure meter 2 and has an exposure-meter interlocking lever 3 provided with meter interlocking means in the form of interlocking pin 4 mounted thereon. Mounted for limited angular rotation on an intermediate ring body 5 is a ring 6 which is provided with a first interlocking means in the form of a pawl 6' formed with a cut-away portion or slot, the pawl being adapted for connection to the meter interlocking pin 4. The ring 6 has a second interlocking means, illustrated as lever 8, supported thereon and movable with respect thereto by means of a pivot pin 7 and normally biased into the solid-line position (FIG. 4) by biasing means, shown as a spring 9. The second interlocking means includes a pin 10 mounted on one end of the interlocking lever 8, the pin being adapted to be connected to an aperture-ring interlocking member, shown as pawl 12', which is provided on the aperture ring 12 of lens barrel 11. Elements 5 through 12' together constitute a preferred embodiment of an intermediate ring assembly in accordance with the invention.

Operation of the present device will now be described. With the interlocking pin 10 and the aperture-ring interlocking pawl 12' maintained in different circumferential positions, the intermediate ring body 5 and the lens barrel 11 are assembled together by means of a bayonet connector. Then, the aperture ring 12 is rotated for connecting the aperture-ring interlocking pawl 12' to the interlocking pin 10. The interlocking pin 10 strikes against the arcuate portion of the aperture-ring interlocking pawl 12' and climbs up the arcuate portion (at the same time, the interlocking lever 8 is being rotated about the pivot 7 in the direction as indicated by arrow in FIG. 4, against the force of the spring 9), whereupon the interlocking pin 10 is received into the slot of the interlocking pawl 12' to establish a connection therebetween, thus permitting the rotatable ring 6 of the intermediate ring assembly and the aperture ring 12 of the lens barrel 11 to be rotated together. Thereafter, the intermediate ring assembly and the lens barrel are mounted on the camera body, and the interlocking pawl 6' of the intermediate ring assembly is connected to the interlocking pin 4 of the exposure meter 2, whereby aperture information may be transmitted from the lens barrel 11 through the intermediate ring assembly to the exposure meter 2.

Thus, according to the device of the present invention, a connection can be established between the aperture ring of the lens barrel and the rotatable ring of the intermediate ring assembly after the lens barrel has been mounted on the intermediate ring assembly. In this way, the mounting procedure and the connecting procedure can be done at different times, thereby reducing the cumbersomeness of the mounting procedure as compared with the conventional mechanism of this type, and substantially simplifying the connecting procedure.

It is believed that the advantages and improved results furnished by the intermediate ring assembly of the invention will be apparent from the foregoing description of a preferred embodiment thereof. Various changes and modifications may be made without departing from the spirit and scope of the invention, as sought to be defined in the following claims.

We claim:

1. An intermediate ring assembly for insertion between a camera body containing an exposure meter and having a meter interlocking member coupled to said exposure meter and an interchangeable lens having an aperture ring and an aperture-ring interlocking member secured to said aperture ring for connection with said meter interlocking member when the interchangeable lens is mounted on the camera body, said intermediate ring assembly comprising:
   an intermediate ring body having a first coupling portion adapted for connection with said camera body and a second coupling portion adapted for connection with the interchangeable lens;
   a rotatable ring rotatably mounted on the intermediate ring body;
   a first interlocking means secured to the rotatable ring for connection with the meter interlocking member when the intermediate ring body and the camera body are connected together; and
   a second interlocking means supported on the rotatable ring and movable with respect thereto for engaging the aperture-ring interlocking member when the intermediate ring body and the interchangeable lens are connected together, said second interlocking means being biased toward the axis of rotation of the rotatable ring, and being movable away from said axis of rotation.

2. An intermediate ring assembly as set forth in claim 1, wherein the second interlocking means is pivotably mounted on the rotatable ring and is pivotable about a second axis.

3. An intermediate ring assembly as set forth in claim 2, wherein said second axis is substantially tangential to said rotatable ring.

4. An intermediate ring assembly as set forth in claim 1, further including a spring for biasing said second interlocking means toward said axis of rotation of the rotatable ring.

5. An intermediate ring assembly as set forth in claim 1, wherein the first interlocking means includes a pawl and the second interlocking means includes a pin.

* * * * *